United States Patent Office 3,448,011
Patented June 3, 1969

3,448,011
STERILE FILTER
Rocco Joseph Russomanno, Wayne, N.J., assignor to Hoffmann-La Roche Inc., Nutley, N.J., a corporation of New Jersey
Continuation of application Ser. No. 531,489, Mar. 3, 1966. This application June 14, 1968, Ser. No. 737,243
Int. Cl. C12b *1/00;* C12k *1/04*
U.S. Cl. 195—139                                    13 Claims

ABSTRACT OF THE DISCLOSURE

A bacteriological filtration and incubation apparatus to test for a micro-organism comprising a container having a filter support bed upon which a filter membrane may be seated during a filtration process, where the filter membrane is adapted to collect a micro-organism from a fluid to be tested which is introduced to the container. A movable unit at the filter support bed enables the filter membrane to be displaced for suspension in the container and a nutrient medium introduced thereto, for growth of the micro-organism. Inlet and outlet ports are included along with means for closing and/or opening the port(s) depending on which one of the various stages of the filtration and incubation process one is at.

---

This application is a continuation in part application of applicant's copending application Ser. No. 531,489, filed Mar. 3, 1966, now abandoned.

The present invention relates to an incubation unit for bacteriological analysis. More particularly, the present invention relates to a sterile filtration unit for sterility testing, micro-organism counts and other microbiological studies, which unit may be disposable.

Presently, a convenient means for sterility testing and for the performance of micro-organism counts in industrial laboratories involves the use of relatively expensive reusable units. The disadvantages which are inherent in the use of such units, as well as equivalent disposable units, are apparent from the common requirements for their operation. For example, typical operation in a filtration process would include a unit having a filter membrane which rests on a support such as sintered glass at the base of the filtration unit. The material to be filtered is poured into the glass tube and the filtrate collected in a side-arm flask or through one inlet of a manifold. Subsequently, the filter membrane is manually removed from the filter unit and placed in a test tube or a petri dish. The test tube or petri dish is then incubated. The filter unit, the side-arm flask and supporting means for the filter unit must be sterilized in order to be reused. The means employed to remove the filter membrane from the filter unit, e.g., forceps, must also be sterilized before reuse, as must the petri dish if it is to be reused.

The unit of this invention combines simplicity of operation with maximum efficiency, permitting an accurate bacteriological system to be set up on an industrial basis and, if desired, the elimination of the petri dish type mechanism. The present invention relates to a sterile unit adapted to permit the growth of micro-organisms either on or from a filter membrane that is freely suspended within the incubation unit. The latter is achieved by incorporation of a mechanism formed as a part of the unit for first holding the filter membrane during a filtration operation and then releasing the filter membrane for suspension purposes as advanced above. Accordingly, no further operation requiring the removal of parts or the contact of forceps with the filter membrane is necessary so that it remains untouched throughout the entire operation of the unit of this invention, from the time the unit was first removed from its sterile container until successful completion of the qualitative and/or quantitative determination of micro-organims. In addition by releasing and suspending the filter membrane at different levels in a nutrient medium the growth of the micro-organisms requiring aerobic conditions is enhanced. Other advantages and/or modifications of the invention are disclosed, one of which, for example, relates to a sterile incubation unit having a top portion adapted to permit filtration to take place under atmospheric pressure while simultaneously avoiding any danger of contamination by the presence of a glass fiber membrane filtering the air which enters the interior of the incubation unit. Although the instant invention may be constructed with thought for reuse as opposed to being disposable, it is ideally expedient for disposable purposes.

Other objects, advantages, and capabilities of the present invention will become apparent from the following detailed description, taken in conjunction with the accompanying drawings illustrating preferred embodiments of the invention.

Figure 1:
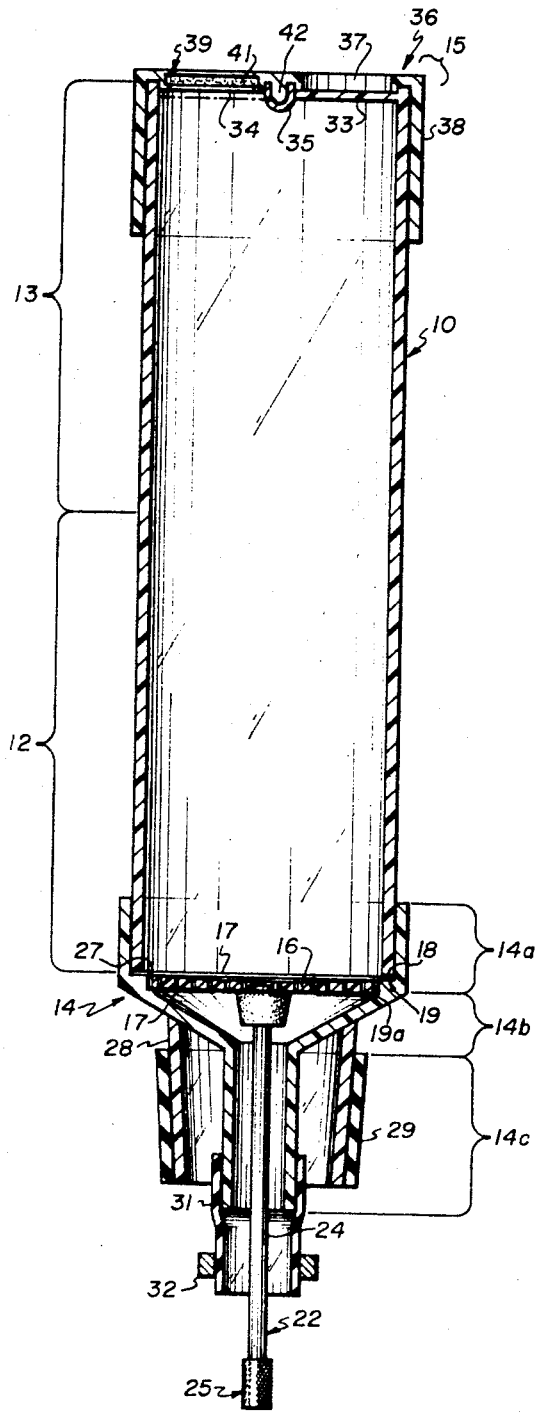
FIGURE 1 is a cross-sectional view of one embodiment of this invention taken along the line 1—1 of FIGURE 5.
Figure 5:
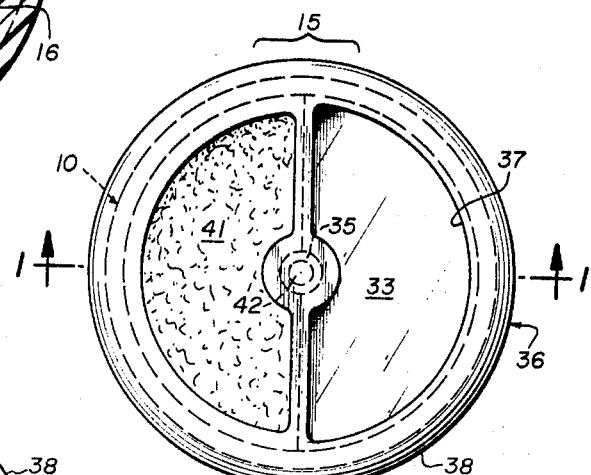
FIGURE 5 is a top view of the embodiment shown in FIGURE 1.
Figure 6:
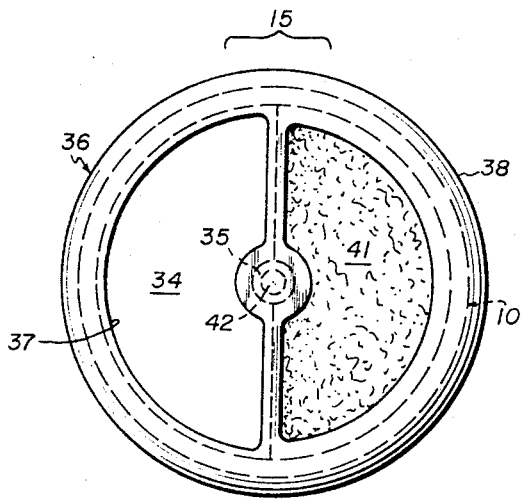

FIGURE 6 is a top view of the same embodiment shown in FIGURES 1 and 5 except that lid 36 is rotated about 180 degrees relative to tubular body 10, from its position as shown in FIGURES 1 and 5.

Figure 7:
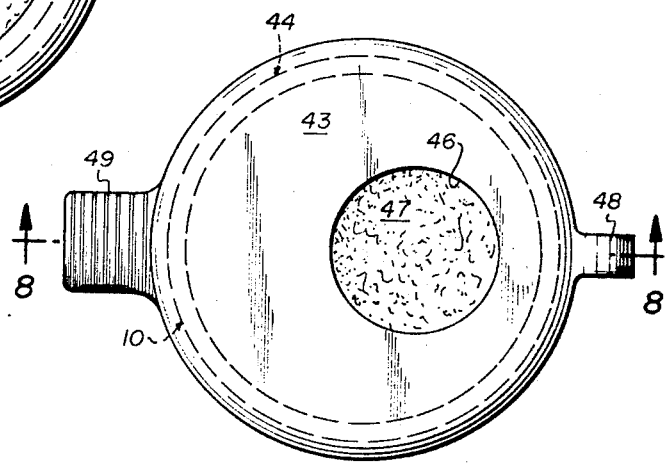

FIGURE 7 is a top view of an alternative top closure which may be employed in the present invention.

Figure 8:
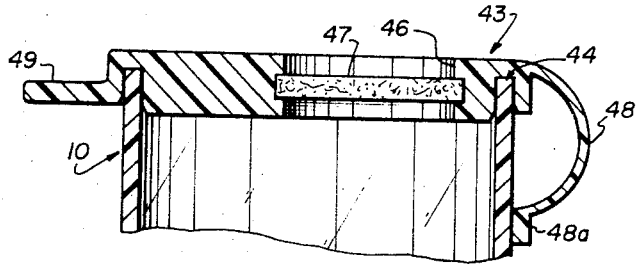

FIGURE 8 is a sectional view of the top closure member taken along lines 8—8 of FIGURE 7.

Figure 9:
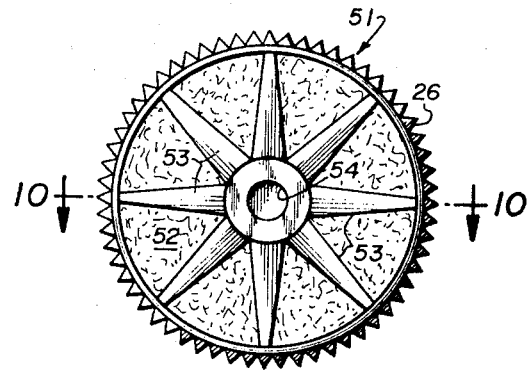

FIGURE 9 is a bottom view of an alternative filter support bed which may be utilized in the present invention.

Figure 10:
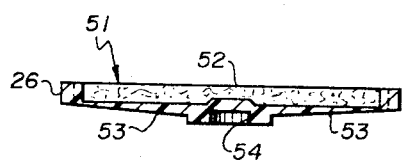

FIGURE 10 is a sectional view of the filter support bed taken along lines 10—10 of FIGURE 9.

Figure 11:
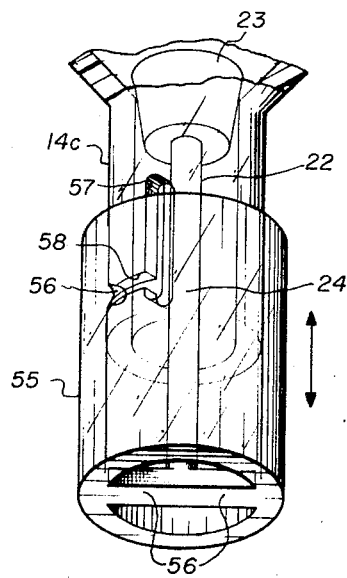

FIGURE 11 is a perspective view of an alternative plunger arrangement which may be used in the present invention.

Figure 2:
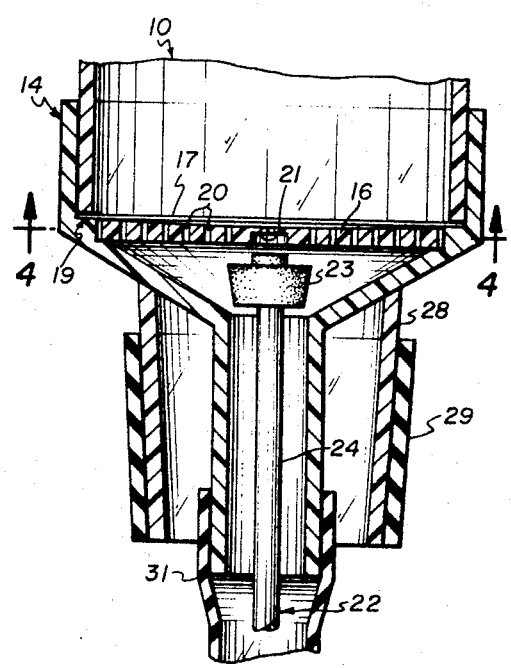
FIGURE 2 is an enlarged view with parts shown in section of the bottom portion of the embodiment shown in FIGURE 1.
Figure 3:
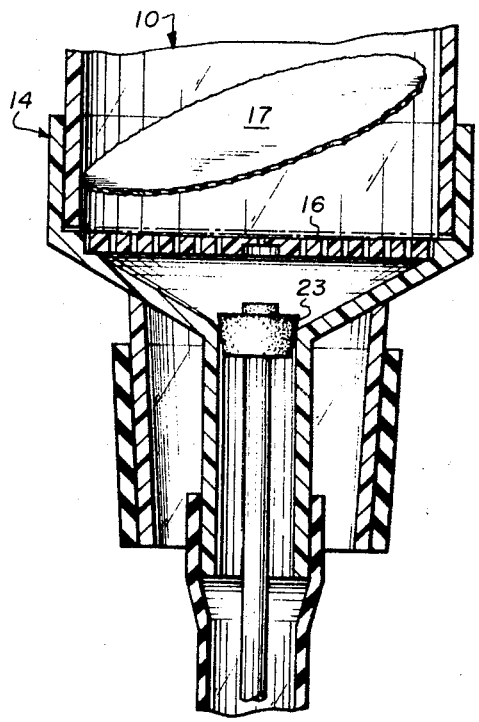
FIGURE 3 is a similar view to that shown in FIGURE 2 but depicting the filter membrane freely suspended, the plunger withdrawn, and the head 23 closing off the outlet port formed by neck 14c.

In general, the unit of this invention comprises a container including a hollow tubular body 10 preferably in the form of a cylinder, having an open-ended bottom portion 12 fitted with a bottom closure member 14. The hollow tubular body 10 of the container also has an open-ended top portion 13 which open end is shown to be enclosed with a top cover member or cap 15. The tubular body 10 is preferably made of a transparent material such as plastic or glass permitting visual observation of its interior. The tubular wall defining bottom portion 12, by means of a force fit, is frictionally engaged within shoulders 14a of bottom closure member 14 as illustrated in FIGURES 1, 2 and 3 of the drawings, which arrangement has been found suitable to prevent leakage. If desired, however, an alternative engaging arrangement might be utilized, such as, for example, a male-female screw thread structure, a groove and tongue combination, etc.

The bottom closure member 14 is of integral construction, but for convenience will be described relative to three visually noticeable portions comprising a cylindrical-shaped shoulder portion 14a, a funnel-shaped portion 14b, and an elongated neck portion 14c. Intermediate funnel-shaped portion 14b and cylindrical-shaped portion 14a, there is formed an annular lip 19 adapted to function in a manner to to be described hereinafter. A fairly level surfaced filter support bed 16 is removably mounted about its periphery at a part of that section of the interior wall formed by the funnel-shaped portion 14b, and in such a position that the upper surface of filter support bed 16 lies adjacent to the opening of bottom portion 12 of the tubular body when fully engaged with bottom closure member 14 as depicted in FIGURES 1, 2 and 3. As illustrated, filter support bed 16 is structurally located to lie between the inlet port communicating with the interior of hollow tubular body 10 and the outlet port contiguous with the lower interior of bottom closure member 14, physically dividing the container into two compartments. A filter membrane 17 is adapted to be centrally seated on the filter support bed 16 and peripherally seated about its marginal edges 18 upon annular lip 19 of bottom closure member 14. The filter membrane 17 is firmly held in place by the lower peripheral walls of the hollow tubular body 10 which are adapted to urge filter membrane 17, at marginal edges 18, tightly against annular lip 19.

Figure 4:
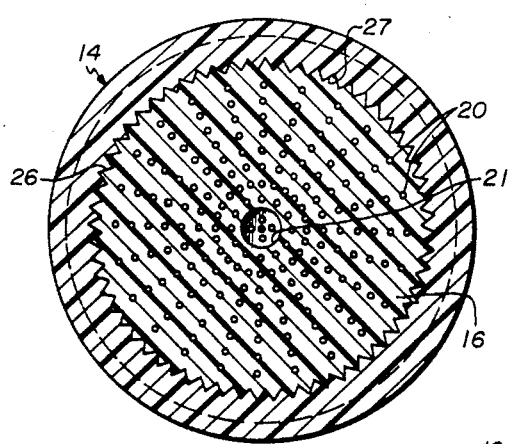
FIGURE 4 is a sectional view taken along lines 4—4 in FIGURE 2.

The filter support bed 16 shown is of disc form and might be made of material such as plastic, glass, rubber, metal, etc. The filter support bed is apertured at 20 in order to provide drainage and simultaneously enable sufficient nutrient to pass, encouraging growth of micro-organisms on filter membrane 17. A second annular rim 19a is preferably provided as a supporting means for filter support bed 16. As may be observed with reference to FIGURE 4, filter support bed 16 is provided about its periphery with a serrated edge configuration 26 adapted to mate with a complementary serrated edge configuration 27 existing about a section of the interior wall of bottom closure member 14. The hollow tubular body 10 is supplied with an interior volume sufficient to sustain the growth of aerobic and anaerobic micro-organisms collected on the filter membrane 17.

It is understood, of course, that aperture configurations, other than the plurality of cylindrical apertures depicted, might be provided in the filter support bed for drainage purposes. For example, a series of radial and/or concentric apertures extending outwardly from the center of the filter support bed could be employed. In any event, it is preferable that the aperture opening in the upper surface of the filter support bed be of such a size that would not cause the filter membrane to rupture either when a fluid medium to be tested is first poured into the hollow tubular body 10, or as a result of the pressure built up by a large accumulation of such a medium within hollow tubular body 10. With realization of the latter, in some cases, it would be desirable to provide a larger opening at the bottom of the filter support bed, which desirability, to some extent, might be accommodated in the case of a plurality of apertures 20 of the type shown in FIGURES 1 through 4 by modifying such apertures to present an inverted conical section configuration.

Illustrated in FIGURES 1–4 is one preferred embodiment of this inveniton where filter support bed 16 has extending along its axis at its underside a cylindrically shaped recess 21. Removably received in recess 21 is a portion of a head 23 of a plunger 22, which plunger also includes a shaft 24, and a handle 25. Although not illustrated, shaft 24 may be removably secured to head 23 by means of a screw thread arrangement. It is, of course, to be understood that equivalent connecting means can be utilized instead of the screw thread connection referred to.

In manipulation of plunger 22 via handle 25, by exerting a light upward pressure along the longitudinal axis of the plunger, similar movement of filter support bed 16 is achieved and it is lifted upwardly simultaneously causing a tearing of filter membrane 17 by the serrated edge configuration 26 to free the filter membrane from its marginal edges 18 and release the filter membrane for upward movement with the plunger into hollow tubular member 10. Subsequent to the above operation, by further manipulation of the plunger via handle 26, the filter support bed be returned to its initial resting position. However, filter membrane 17, once having been released and directed inwardly into the interior of hollow tubular body 10, will remain suspended therein by frictional engagement of its serrated edge with the inner surface of the hollow tubular body.

With particular reference to the filter support bed 16, in order to better provide a clean-cut disengagement of filter membrane 17 from its marginal edges 18, aside from the serrated configuration cutting technique, it would be advantageous to supply a slight concave or similar effect surface at the top surface of the filter support bed 16 as depicted in FIGURES 1 and 2. The depression formed by such a concavity extending inwardly from marginal edges 18 toward the center of the filter support bed would ensure that upon upward longitudinal movement of the filter support bed, the higher elevated serrated edge area 26 will be the first surface area of the filter support bed that would contact filter membrane 17 and thus the first area where pressure is applied to filter membrane 17 to better enable a clean-cut tear to be achieved along marginal edges 18 for readily releasing filter membrane 17 along its marginal edges 18 for suspension or flotation within hollow tubular body 10.

The bottom closure member 14 preferably is funnel-shaped and comprises an elongated neck 14c defining an outlet port about which is formed a transparent tapered cylinder 28, the latter being encircled around a section of its circumference by a band 29 of a resilient medium such as rubber for readily seating the unit as a whole during typical usage on a flask or manifold inlet. The tapered cylinder 28 is fixedly secured to funnel-shaped portion 14b by welding or other suitable techniques so as to be made integral with bottom closure member 14. Cylinder 28 is preferably of the same transparent material of which hollow tubular member 10 is constructed. Elongated neck 14c is given a cross-section of such dimensions that when head 23 of plunger 22 is moved downwardly away from the filter support bed 16, head 23 can be easily force-fitted into the interior walls of the elongated neck, as illustrated in FIGURE 3, to plug up the outlet port, thereby sealing the interior of bottom closure member 14 from communication with the atmosphere. Rotation preventing means can be provided so as to prevent rotation of head 23 when snugly positioned in neck 14c enabling shaft 24 to be conveniently removed from head 23, if expedient. Those of ordinary skill in the art will recognize various conventional rotation preventing means that can optionally be employed, e.g., a tongue and groove arrangement, a retaining detent, or male and female knurls, etc.

If desirable, elongated neck 14c might be connected about its circumference with a flexible rubber tubing 31 for further directing the flow of liquid media flowing out of the outlet port. Rubber tubing 31 might also be provided with a clamp 32 to control the flow of liquid from the interior of bottom closure member 14 in lieu of the plunger arrangement.

One type of cap arrangement which may be employed with the present invention is shown in FIGURES 1, 5 and 6, wherein transverse of the opening of top portion 13 and integrally formed therewith is shown a solid member 33 forming a semicircular plane covering slightly more than approximately one-half of the opening of top portion 13. The remainder of the top portion is left as an opening 34 to hollow tubular body 10. At the center of the opening of top portion 13 and secured to solid member 33 is a cup-shaped member 35 to be used in a manner described below. This cap arrangement further comprises a removable lid 36 for further enclosing the top portion of tubular member 10; the lid includes an opening 37 adapted to communicate with opening 34 to serve as an inlet port for the container for a purpose to be more particularly described hereinafter. The overlapping side 38 of lid 36 is cylindrical in shape to furnish a snug fit with the exterior of tubular body 10 when placed thereon. Lid 36 further includes an aperture 39 completely occupied by a transversely extending bacteriological filter 41 made of material such as fiberglass, for enabling sterile air to enter the filter. In the center and at the underside of lid 36 is a projection 42 adapted for rotatable engagement within cup-shaped member 35 when lid 36 is properly fitted on tubular body 10. Of course, the structural considerations including close-fitting tolerances in mating lid 36 with the top of the tubular body are such to ensure that the interior of tubular member 10 is made resistant to outside contamination during filtration and incubation. In manipulation, lid 36 is slidably inserted over the outer peripheral surface of the top portion of tubular member 10 in close contiguous relationship. The contiguous relationship is such, as noted above, to permit ready rotation of lid 36 about the axis of the tubular member 10 but, at the same time, to prevent relative longitudinal sliding movement between the two members except, of course, on the exertion of a sufficient amount of force. When the device is ready for use, lid 36 is rotated so that the opening 37 communicates with the opening 34 to present an inlet port to the container. After depositing the material to be filtered through these two openings 34, 37 into the interior of tubular member 10, lid 36 is then rotated to such a position whereby no portion of opening 37 communicates with the opening 34, thereby closing the inlet port. Thus, the material to be filtered, subsequent to being placed within tubular body 10, may be exposed to gaseous communication with the atmosphere but only through bacteriological filter 41.

There are shown in FIGURES 7 through 11 several alternative embodiments usable with the present invention which embodiments individually or together may be readily incorporated into the framework of the preferred embodiment of the present invention illustrated in FIGURES 1 to 6. In particular, FIGURES 7 and 8 depict an alternative top cover member or cap which might be employed in less automated filtration set-ups wherein an entire open-ended circular area of top portion 13 of hollow tubular body 10 is adapted to be covered by a removable lid 43 in a snap-like fashion, the lid having an annular groove 44 adapted to frictionally receive the uppermost rim of the hollow tubular member 10. Included within the lid 43 is a recessed area 46 traversed by a bacteriological filter 47. For convenience, lid 43 is pivotally connected at 48a by suitable means to the outer side of hollow tubular member 10 via a flexible member 48, and to conveniently snap open the lid from hollow tubular member 10, a tab 49 is provided.

With reference to FIGURES 9 and 10, there is shown a filter support bed 51 which may be utilized, if desired, in lieu of the apertured filter support bed 16. The instant alternative bed is of a foraminous material 52 such as a heavy fabric or paper either being sufficiently porous to provide adequate drainage of a fluid to be employed from hollow tubular body 10 into bottom closure member 14. To enhance the structural rigidity of the filter support bed a support frame including a number of spaced radially extending projections 53 is placed at the bottom surface thereof whereby projections 53 extend outwardly from a centrally positioned female member 54 to the outer periphery of the circumference of the filter support bed. It is readily understood that female member 54 is adapted to receive head 23 of plunger 22 for functioning in a manner heretofore described.

Illustrated in FIGURE 11 is a modification of the plunger 22 whereby in lieu of a plunger handle 25 for manually displacing the filter support bed or closing the outlet port, there is shown a cylindrical sleeve 55 adapted for relative sliding movement with and about bottom closure member 14c. A pair of horizontal arms 56 connect the bottom of plunger 22 with the sleeve 55 enabling the plunger 22 to be readily moved from without by manual manipulation of sleeve 55. A vertical groove 57 is located in the outer periphery of bottom closure member 14c, the vertical groove being adapted to receive a finger 56 projecting out from the inner surface of cylindrical sleeve 55 thereby capturing sleeve 55 on to closure 14c for vertical relative movement. To maintain head 23 in a closed position, an angular locking groove 58 transverse to groove 57 is provided, enabling sleeve 55 to be slightly rotated about closure, 14c, in the Y direction and simultaneously pull head 23 downwardly and snugly seated and locked into the interior walls of elongated neck 14c.

By way of illustration, the preferred embodiment of this invention can be typically used as follows:

A presterilized device according to the embodiment of this invention, as shown in FIGURES 1–6, would initially be removed from a disposable receptacle, e.g., a sterile polyethylene bag. The lid 36 is rotated so that opening 37 communicates with opening 34 to form an inlet port to the container. The material which is to be filtered is then poured or aseptically transferred through adjoining openings 34, 37. Aseptic transfer can be accomplished by known means, e.g., a cornwall pipetting syringe attached to tubing linked to a glass bell to serve as projection from contamination, e.g., Russomanno and Wollish, Journal of Pharmaceutical Sciences, 53, 1538 (1964). Lid 36 is then rotated to a position where opening 37 in no way communicates with opening 34 to close off the inlet port. At this juncture, via the passageway formed by the bacteriological filter 41, air is accessible to the interior of the container. As the filtrate is poured or aseptically transferred into tubular body 10, it will flow through filter membrane 17 where micro-organisms which are present in the material to be filtered are filtered out and collected on the body or filter membrane 17. The filtrate continues to pass or drain through the filter support bed 16 and onward out through the outlet port in elongated neck 14c. After draining and perhaps introducing a nutrient wash, filter membrane 17 may be released by way of plunger 22 as heretofore described whereby upon moving plunger 22 upwardly, filter membrane 17 will be torn along its marginal edges 18 by way of the serrated cutting edge 26 on the filter support bed 16. In continuing the inward movement of the plunger, the filter membrane 17 will be lifted upwardly enabling the same to be freely suspended within the hollow tubular body by frictional engagement of the serrated edges 26 with the walls of body 10. The plunger is then pulled downwardly until filter support bed 16 is returned to its original position. The head 23 via handle 25 is then pulled free from its frictional fit with the filter support bed and continued to be pulled downward until the head is snugly seated within elongated neck 14c as depicted in FIGURE 3 thereby closing off the outlet port, causing head 23 to act as a barrier to prevent the escape of subsequently added nutrient medium from the interior of funnel-shaped base 14. If desired, shaft member 24 might be removed from head member 23 by unscrewing the same. The nutrient medium may be then introduced into hollow tubular member 10 by again rotating lid 36 so that the opening 37 therein communicates with opening 34. Once the nutrient medium is introduced, lid 36 once again is rotated so that no portion of the opening 37 therein communicates with the opening 34. The entire unit can now be incubated, and the micro-organisms previously collected on filter membrane 17 can be cultured without defects arising in the system due to the introduction of nonsterile adjuvants, as no further operation requiring the removal of parts or the contact of forceps with the filter membrane is necessary so that it remains untouched throughout the entire operation of the unit of this invention, from the time the unit was first removed from its sterile container until successful completion of the qualitative and/or quantitative determination of micro-organisms.

Furthermore, the filter membrane due to its suspension, within the nutrient medium, will enhance growth conditions for those micro-organisms on the filter membrane requiring aerobic conditions for growth.

Other modes of construction or operation of the present invention, such as, for example, with any one or all of the alternative embodiments shown in FIGURES 7 through 11 may be made therein without departing from the spirit and scope of the invention, and it is desired, therefore, that only such limitations shall be placed on the invention as are imposed by the prior art and as set forth in the appended claims.

I claim:

1. A bacteriological filtration and incubation unit comprising in combination container means having inlet and outlet port means and adapted to receive a fluid to be tested for a micro-organism, means for closing said inlet and outlet port means, said container means including engagement means to hold a filter membrane in the container means for collecting such a micro-organism, a filter support bed, means for holding said filter support bed between said inlet and outlet port means and to underlie such a filter membrane, drainage means included in said filter support bed enabling said fluid to readily drain through the filter membrane to said outlet port, and releasing means supported in said unit and having relative motion with said filter support bed for freeing said filter membrane of said engagement means allowing the filter membrane to be suspended in a nitrient medium introduced to said container means for growth of a micro-organism collected on said filter membrane.

2. Apparatus according to claim 1 including a filter membrane.

3. Apparatus according to claim 2 wherein said releasing means includes means for severing and displacing said filter membrane.

4. Apparatus according to claim 3 wherein said engagement means is structurally arranged to be limited to contact with a marginal edge of the filter membrane.

5. Apparatus according to claim 4 wherein said severing and displacing means includes a cutting edge on said filter support bed and a plunger connectable with the filter support bed for cutting and lifting said filter membrane within said container for maximum exposure to a nutrient medium.

6. Apparatus according to claim 5 wherein said filter support bed is constructed of nonabsorbent material and said drainage means includes a plurality of apertures.

7. Apparatus according to claim 5 wherein said drainage means includes an absorbent foraminous member of which said filter support bed is generally constructed.

8. Apparatus according to claim 5 wherein said container means includes a bottom closure member located to one side of said filter support bed and including said outlet port.

9. Apparatus according to claim 8 wherein said plunger is movably mounted in said bottom closure member and removable from said filter support bed, and said means for closing the outlet port comprises a head forming a part of said plunger and adapted with movement of the plunger to plug up said outlet port.

10. Apparatus according to claim 3 wherein said inlet port closure means comprises a movable lid including bacteriological filter means and inlet port means whereby said lid is movable to open and close said inlet port means to said container, whereby in a closed condition said bacteriological filter will admit sterile air to said container.

11. Apparatus according to claim 9 including means for connecting said plunger to a movable member positioned outside of said bottom closure member to control the plunger movement from without.

12. Apparatus according to claim 3 whereby the upper surface of the filter support bed is slightly recessed from a center thereof to said severing means.

13. Apparatus according to claim 11 including locking means for locking said movable member relative to said bottom closure member to hold the head of said plunger in a closed condition.

References Cited

UNITED STATES PATENTS 2,879,207   3/1959   Poitras _____ 195—103.5

ALVIN E. TANENHOLTZ, *Primary Examiner.*

U.S. Cl. X.R.

195—103.5, 127, 142